C. L. RILEY.
PROCESS AND APPARATUS FOR REFINING VEGETABLE OILS.
APPLICATION FILED NOV. 16, 1917.
1,320,093.
Patented Oct. 28, 1919.
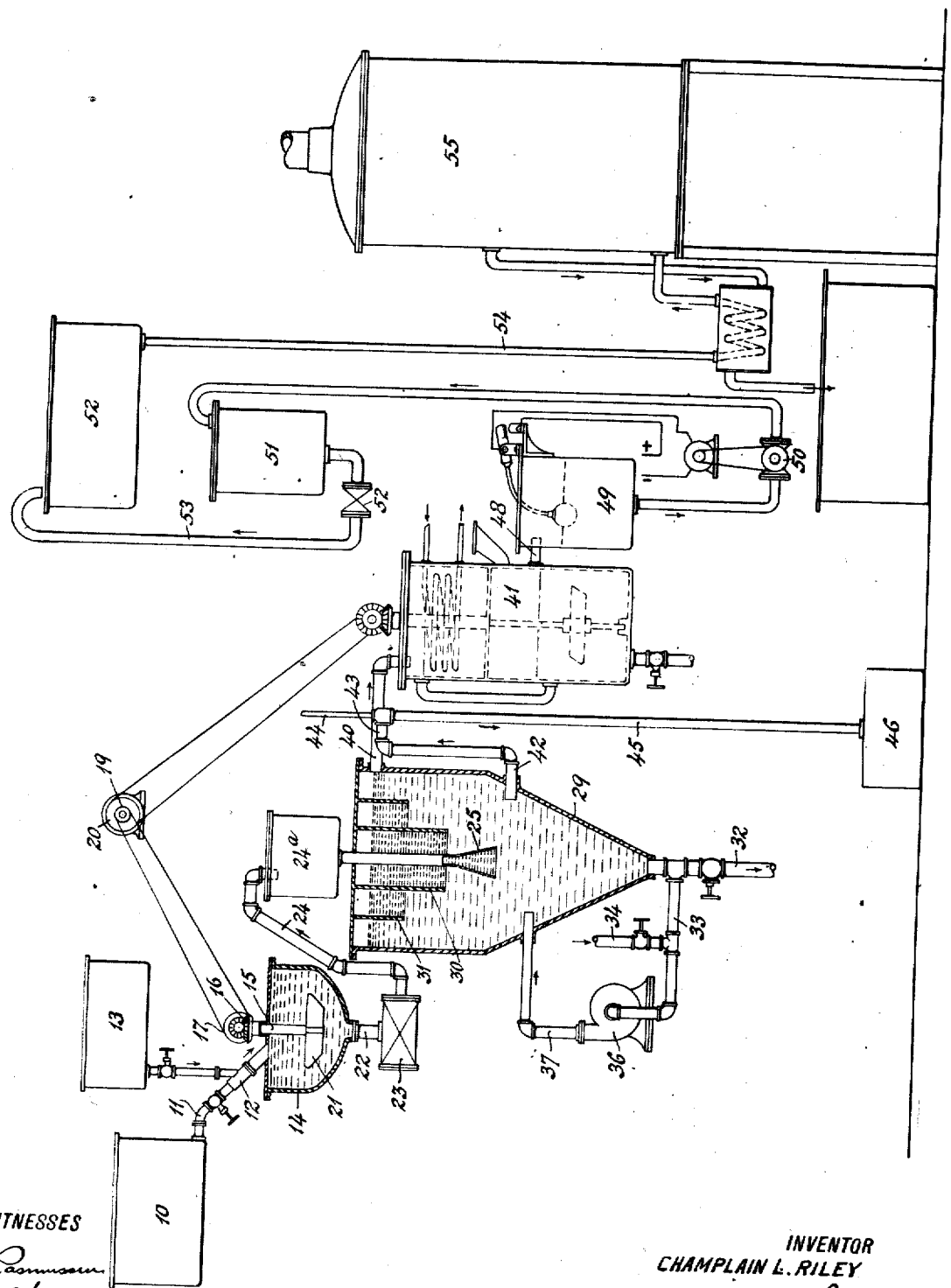
WITNESSES
INVENTOR
CHAMPLAIN L. RILEY
ATTORNEYS

UNITED STATES PATENT OFFICE.

CHAMPLAIN L. RILEY, OF NORTH PLAINFIELD TOWNSHIP, SOMERSET COUNTY, NEW JERSEY, ASSIGNOR TO CLARK, MacMULLEN & RILEY, OF NEW YORK, N. Y., A CORPORATION OF NEW YORK.

PROCESS AND APPARATUS FOR REFINING VEGETABLE OILS.

1,320,093.   Specification of Letters Patent.   Patented Oct. 28, 1919.

Application filed November 16, 1917. Serial No. 202,272.

*To all whom it may concern:*

Be it known that I, CHAMPLAIN L. RILEY, a citizen of the United States, and a resident of the Township of North Plainfield, in the county of Somerset, in the State of New Jersey, have invented certain new and useful Improvements in Processes of and Apparatus for Refining Vegetable Oils, of which the following is a specification.

My invention relates to apparatus for and the arts of refining vegetable oils and more particularly to the apparatus and the arts of refining cocoanut oils.

Heretofore the refining of such oils was an expensive and tedious process and the product obtained under commercially practicable conditions was inferior to the product obtained by this, my present invention. I do not, of course, mean to imply that a product has never been obtained comparable with the product obtained by my process, since by repeating the refining processes heretofore in use no doubt a very satisfactory product might be obtained, but such repeated refining would render the cost of the product very high and hence not commercially practicable. My invention, therefore, produces not only a much purer product than when treated with a process as cheap as my process, but produces the product more economically and expeditiously.

My invention contemplates further, in addition to the broad idea of economical treatment of oils, the improvements in the various elements and appurtenances which contribute to the results above described, particularly in the substitution of a continuous process for the batch process heretofore in use as will more fully appear hereinafter.

Cocoanut oils, or the copra oils as they are more usually designated when the raw materials are referred to, or cottonseed oil, contain some of the fatty acids which are usually neutralized by the addition of an alkali whereby a material capable of being dissolved by water (*i. e.*, containing soap) and an oil are obtained, the oil being further refined in the usual manner by filtration, cooking, and the like steps. The separation of the oil and soapy material as specified is usually effected by permitting the material to settle to the bottom of a suitable receptacle, and the oil which due to its low specific gravity floats above the soapy material is usually removed by decantation. This method, however, is objectionable as not only is the settling and separation of the soapy material and oil incomplete in the container, but in decantating, it is very difficult to determine the exact line of demarcation between the oil and soapy material, hence the usual result is that either some of the soapy material is decanted with the oil, or else some of the valuable oil is left with soapy material. I have overcome these difficulties to a great extent by settling the soapy material in a novel manner in which a fluid preferably of a specific gravity lower than the oil *e. g.*, water, acts in a positive manner to separate the oil and the soapy material, by dissolving the material and in washing the oil. The fluid acts as a wash for the oil causes a more complete and rapid separation of the soapy material from the oil than has heretofore been possible. The separation of substances in which one is dissolved by the action of a fluid and the other caused to float may be applied to other arts where such separation is often desirable, particularly when it is desired to subject such floating substance to a washing action as will hereinafter be more fully described in connection with my treatment of cocoanut oils. Other objects and advantages will more fully appear in the specific description of my apparatus and processes, which shows one of the numerous forms in which my invention may be embodied.

The drawing forming part of this application and showing one example of my invention represents an elevation of the apparatus partly in section and partly diagrammatic.

Referring to the drawing a feed supply tank 10 of any suitable construction has connected to its lower portion, an outlet pipe 11 provided with suitable valves for regulating the flow of liquid therein. A coupling 12 is connected to the outlet 11 and has a connection communicating with a suitable supply tank 13 for the neutralizing material. This neutralizing material is preferably caustic alkali, *e. g.*, sodium hydroxid in 10% solution. The end of the pipe 12 terminates in a neutralizing chamber 14. This chamber is provided with an agitator which may be of any suitable construction, such for instance as shown in the drawing, in which the agitator comprises a vertical spindle 15 geared by means of the beveled gears 16 and 17 to a belt pulley 19, which is driven by a motor 20. Affixed to the spindle 15 are a plurality of paddles 21 which keep the solution in the neutralizing chamber 14 in agitation. The proportion of the belt pulley 19 to the pulley of the motor 20 is such that the speed of the paddles is suitably reduced to prevent undue splashing in the neutralizing chamber 14. An outlet pipe 22 extends from the lower portion of the neutralizing chamber 14 to a suitable pump 23, which has connected thereto piping 24, terminating in an accumulating tank 24$^a$, to permit the materials entering said tank to react more completely than would ordinarily occur in the chamber 14. The tank 24$^a$ may, of course, be eliminated under certain conditions, e. g., where a neutralizing chamber as 14 of relatively large dimensions is provided. Extending from the lower portion of the tank 24$^a$ is a pipe terminating in an inverted coneshape nozzle 25, the function of which will more fully appear hereinafter. A separating reservoir 29 of any suitable form is provided and has connected to its cover or to suitable brackets in case the reservoir is open at the top, baffle cylinders 30 and 31 located concentric with respect to the inverted cone 25 and has extending from its lower conical portion a free fall pipe 32 connected with piping 33 and hot water inlet 34. It is obvious that these cylinders 30 and 31 will at all times contain a body of liquid which is maintained as a separate pool within the entire body of liquid in the reservoir 29. Inasmuch as this pool has no upper outlet, and as soap cannot rise into it, the pool will be constituted at all times of practically clear oil, which in order to leave the apparatus must pass under the lower edge of the cylinder 31 and again in an upward direction through the constricted portion of the fluid which surrounds the cylinder 31. The employment of the cylinders 30 and 31, as is readily seen from the drawing, divides the body of liquid in reservoir 29 in such a way that the major portion of the liquid in reservoir 29 occupies a relatively large sectional area while toward the upper part of the reservoir the liquid which may overflow is maintained in a condition of constricted sectional area. A circulation pump 36 is connected to the piping 33 and has connected therewith piping 37 connecting with the reservoir 29. The pump 36 maintains a circulation of a suitable liquid, for example, water, in the separating reservoir 29. The circulation of the solvent thus established results in continually dissolving a part of the soapy material by agitating the two together, which prevents the soap from at any time becoming so thick as to clog the apparatus. By repeatedly circulating the solvent, the soapy fluid may be brought to the desired consistency or strength required for further treatment, and may then be maintained in that state. From the upper part of the reservoir 29 extends an overflow pipe 40 connected with a decolorizing chamber 41 of the usual construction. The reservoir 29 is tapped by piping 42 below the surface of the circulating fluid maintained by the pump 36, the said piping having, for example, a U shaped bend 43 by which the level, hereinbefore described, of the fluid in the separating reservoir 29 may be maintained at a predetermined level. The conduit formed by bend 43 and the pipe leading therefrom to the chamber 46 is lower than the conduit of the oil outlet 40, the difference in level automatically maintaining a predetermined depth of oil above the solvent. Thus, no matter what the relative proportion of oil, soap and solvent may be, the depth of the oil layer will adjust itself so as to be substantially constant, since any excess of solvent and soap will immediately overflow through pipe 42 while an excess of oil at once results in an increased volume of overflowing oil at 40. The U shaped bend 43 is provided with suitable vent 44 adapted to break any possible vacuum in the fall pipe 45 so that the material will not siphon out of the separating chamber 29 but will flow in accordance with the height of the fluid in the reservoir 29 with respect to the U shaped bend 43. The fall pipe 45 is connected to a storage tank 46 located at the lower end thereof. A decolorizing chamber 41 is provided with an outlet 48 communicating with the storage tank 49. The height of the liquid in the storage tank 49 may be controlled by any suitable means such as the example shown in the drawing which comprises a ball float valve which controls a pump 50 in accordance with the height of the liquid in the tank 49. The pump 50 pumps the oil to a filter press 51. A pump 52 pumps the oil to a still supply tank 52 connected by piping 53 with the filter press 51. Extending from the lower portion of the still supply tank 52 is the piping 54 communicating with a cooking apparatus 55 of the usual and well known construction.

The decolorizing chamber 41, the tanks 49 and 52, the filter press 51 and the cooking chamber 55 are all of the usual and well known type employed in the refining of cocoanut oil.

When I speak in my claims of a solvent for soap I mean a solvent capable of dissolving the soluble materials formed by the action of an alkali on a vegetable oil and when I speak of a soapy material I mean such soluble materials.

When I speak of various materials I only mean such materials as are suitable.

I claim:—

1. The improvement in the art which comprises introducing a mixture containing a partially refined vegetable oil and soap into a solvent for soap and withdrawing portions of the soapy solvent from the mixture of oil and soap introducing a fresh supply of solvent to the soapy solvent and recirculating said diluted solvent substantially as and for the purpose described.

2. The improvement in the art which comprises introducing a mixture containing a partially refined vegetable oil and soap into a solvent for a soap and withdrawing portions of the soapy solvent from the mixture of oil and soap and re-introducing the soapy solvent into the mixture, substantially as and for the purpose described.

3. The improvement in the art which comprises introducing a mixture containing a partially refined vegetable oil and soap into a confined body of liquid overflowing at its upper level, providing within the upper level of said liquid a series of pockets communicating with each other at their lower portions, one of said pockets being in communication at the upper level of the liquid with its overflowing portion, causing the oil as it separates in the liquid to rise into said pockets whereby when a portion of the oil already contained in any one of the pockets which is not in direct communication with the overflowing portion of the oil is displaced from said pocket it is forced to travel through a portion of the main body of liquid before it is able to reach the overflowing portion of the oil.

4. The improvement in the art which comprises establishing a circulating solvent for soap and continually introducing to the said circulating solvent so as to be supported thereon and commingled therewith a mixture of soapy material and oil, separating the oil from the soap out of the liquid supported by said circulating solvent, and recovering from the circulating solvent soapy material dissolved during circulation.

5. In an apparatus of the character described, the combination with means to mix an oil and a neutralizing agent, of a separating tank having an outlet for oil near its upper part, an inlet for the introduction of liquid solvent of the soapy constituent of said mixture, an outlet for the soapy solvent, and means communicating with said inlet and outlet for causing the repeated introduction of the solvent into and withdrawal of the solvent from said tank.

6. In an apparatus of the character described, the combination with means to mix the oil and a neutralizing agent, of a separating chamber having an outlet, means to maintain a repeated circulation of a solvent for soap in said separating chamber and means to introduce a quantity of solvent into said circulating means whereby a portion of the dissolved soapy material is caused to overflow through said outlet.

7. In an apparatus of the character described the combination with means to mix the oil and a neutralizing agent, of a separating chamber, means to maintain a circulation of solvent for soap in said separating chamber, means to regulate the height of solvent in said chamber and means to introduce a quantity of solvent into said circulating means, such increase causing a substantial equivalent quantity of dissolved soapy material to flow through said regulating means.

8. In an apparatus of the character described, the combination with means to mix an oil and a neutralizing agent, of a separating chamber containing a solvent for soap, a vertical pipe in communication with the chamber of said mixing means, a plurality of baffles concentric with said pipe, the said pipe terminating below the surface of said solvent and the successive baffles terminating successively nearer the surface of said solvent, means to maintain a circulation of the solvent for soap in said separating chamber, means to introduce a supply of solvent to said chamber and overflow means connecting with said separating chamber through which the dissolved soapy material is adapted to overflow when a further supply of solvent is admitted to the chamber.

9. The process of continuously separating a mixture of oil and soap which consists in continuously introducing to a mixture thereof, a solvent for the soap, maintaining a substantial depth of oil at the upper part of the mixture, continuously withdrawing oil and soapy solvent, the oil being withdrawn at a higher overflow level than the soapy solvent, periodically introducing a further supply of the mixture and establishing a positive separation between the oil and the soap, between the point where the mixture is introduced and the point where the oil is withdrawn.

10. The process of continuously separating a mixture of oil and soap which consists in continuously introducing to a mixture thereof, a solvent for the soap, maintaining a substantial depth of oil at the upper part of the mixture, continuously withdrawing oil and soapy solvent, the oil being withdrawn at a higher overflow level than the soapy solvent, periodically introducing a further supply of the mixture, continuously agitating the mixture and circulating part of the soapy material, both by means of said solvent, and establishing a positive separation between the oil and the soap, between the point where the mixture is introduced, and the point where the oil is withdrawn.

11. The process of separating oil from a mixture of soapy material and oil, said mixture being produced by neutralizing the fatty acids contained in vegetable oil, which comprises confining a body of said liquid to permit a gravity separation of oil and soapy material, maintaining within the confined body of liquid a separate body of oil, which at its lower portion is in communication with the body of the liquid, withdrawing oil from the top of the liquid at a region of the liquid other than that occupied by said body of oil, supplying additional volumes of the original mixture to the confined body of liquid and withdrawing soapy material therefrom.

12. The process of separating oil from a mixture of soapy material and oil, said mixture being produced by neutralizing the fatty acids contained in vegetable oil, which comprises confining a body of said liquid to permit a gravity separation of oil and soapy material, withdrawing oil from the top of the liquid, maintaining within the upper portion of said liquid a stepped obstruction adapted to force a substantial portion of the oil to rise in successive stages and to force all of the oil to rise to the surface in a passage way less in cross section than the cross section of the main portion of the body of the liquid, supplying additional volumes of the original mixture to the confined body of liquid and withdrawing soapy material therefrom.

13. The process which comprises continuously neutralizing the fatty acids contained in vegetable oils whereby a soapy material and an oil are obtained and continuously supplying such liquid to a confined space, maintaining in said confined body of liquid but spaced from the overflow, a pool of separated oil which at its lower portion is in communication with the body of confined liquid, overflowing oil from the upper level of said body of liquid and withdrawing soapy material therefrom.

14. The continuous process which comprises confining a liquid mixture of oil and soapy material to permit a gravity separation of oil and soapy material, maintaining within the confined body of liquid mixture separate bodies of oil, one of which is at its lower portion in communication with the body of the liquid mixture, withdrawing oil at the top of one of the separate bodies of oil, continuously supplying additional volumes of the original mixture to the confined body of liquid and withdrawing soapy material from the confined liquid at a point below the lower level of the separated oil discharging from the confined volume of liquid.

In testimony whereof I have hereunto set my hand.

CHAMPLAIN L. RILEY.